United States Patent
Hopkins et al.

[15] 3,681,898
[45] Aug. 8, 1972

[54] DUAL MEDIA AIR FILTER

[72] Inventors: John D. Hopkins, Franksville; James C. McLaren, Racine, both of Wis.; Ronald A. Johnson, Jackson, Mich.; Robert J. Offer, Racine, Wis.

[73] Assignee: Tenneco Inc., Racine, Wis.

[22] Filed: July 27, 1970

[21] Appl. No.: 58,395

Related U.S. Application Data

[63] Continuation-in-part of Ser. No. 797,466, Feb. 7, 1969.

[52] U.S. Cl. .................55/487, 55/498, 55/502, 55/510, 55/514, 55/521, 55/528, 210/489, 210/493

[51] Int. Cl. ...............................B01d 27/06

[58] Field of Search.................55/497–500, 521, 55/510, 514, 502, 485–487, 276; 210/493, 488–492

[56] References Cited

UNITED STATES PATENTS

| | | |
|---|---|---|
| 2,002,936 | 5/1935 | Davies..........................55/499 |
| 2,521,984 | 9/1950 | Lang............................55/486 |
| 3,293,830 | 12/1966 | McKinlay.....................55/498 |
| 3,339,533 | 9/1967 | Nordstrom...................55/485 |
| 3,353,341 | 11/1967 | Stripp.........................55/502 |
| 3,365,864 | 1/1968 | Iizima.........................55/485 |
| 3,458,978 | 8/1969 | Davis..........................55/499 |
| 3,570,223 | 3/1971 | Svoren.........................55/510 |

FOREIGN PATENTS OR APPLICATIONS

| | | |
|---|---|---|
| 239,122 | 6/1962 | Australia.....................55/510 |
| 799,118 | 7/1958 | Great Britain..............55/276 |

*Primary Examiner*—Bernard Nozick
*Attorney*—Harness, Dickey & Pierce

[57] ABSTRACT

An air filter construction that provides a high capacity and high efficiency in low overall height and is suitable for use with high performance automobile internal combustion engines includes a dual media filter in which a pre-wetted upstream fibrous depth filter element is secured to a downstream paper element and a metal backfire screen by resilient peripheral seals that may be mounted on suitable ledges inside of a suitable air filter housing.

4 Claims, 11 Drawing Figures

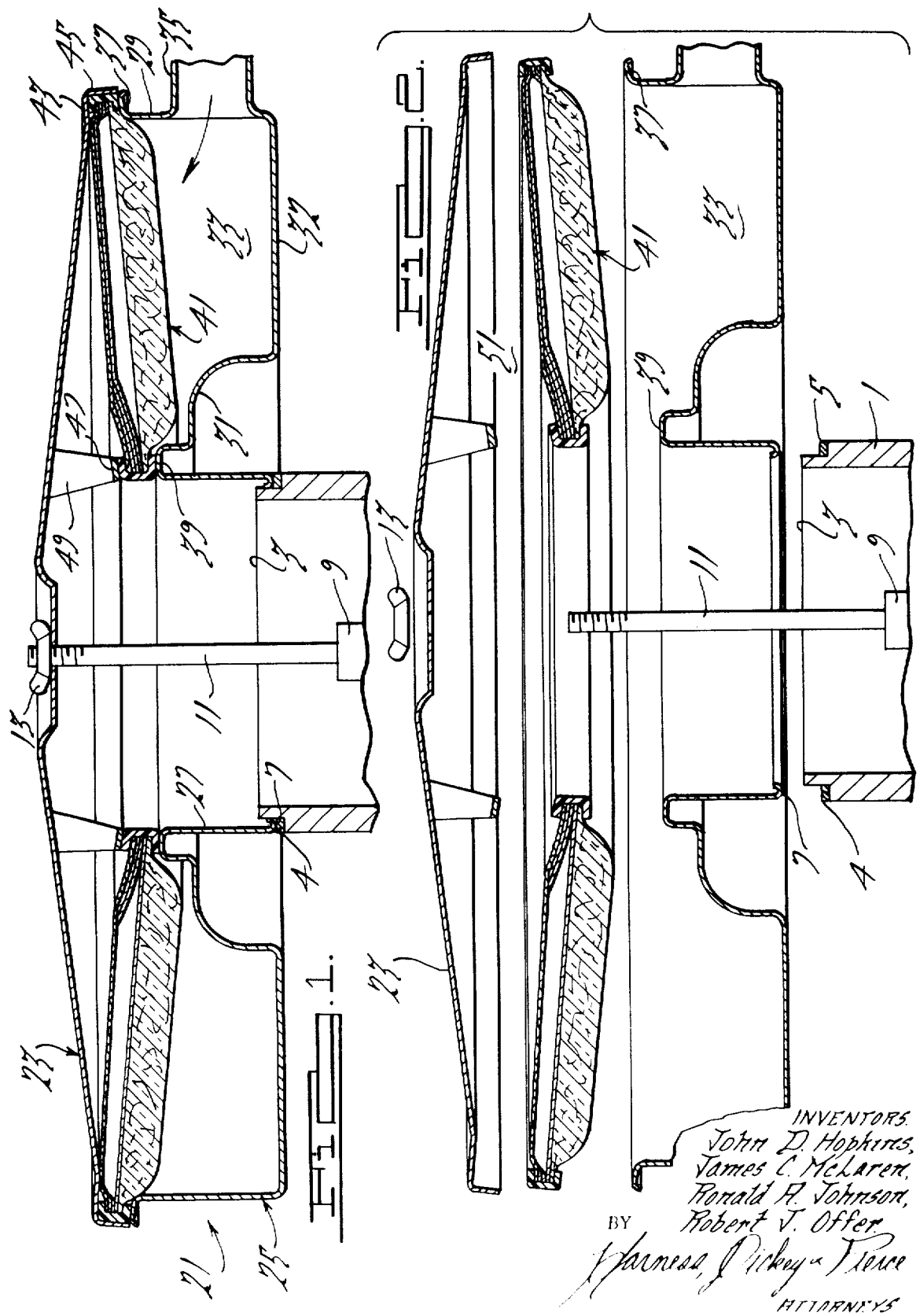

PATENTED AUG 8 1972
3,681,898
SHEET 2 OF 3
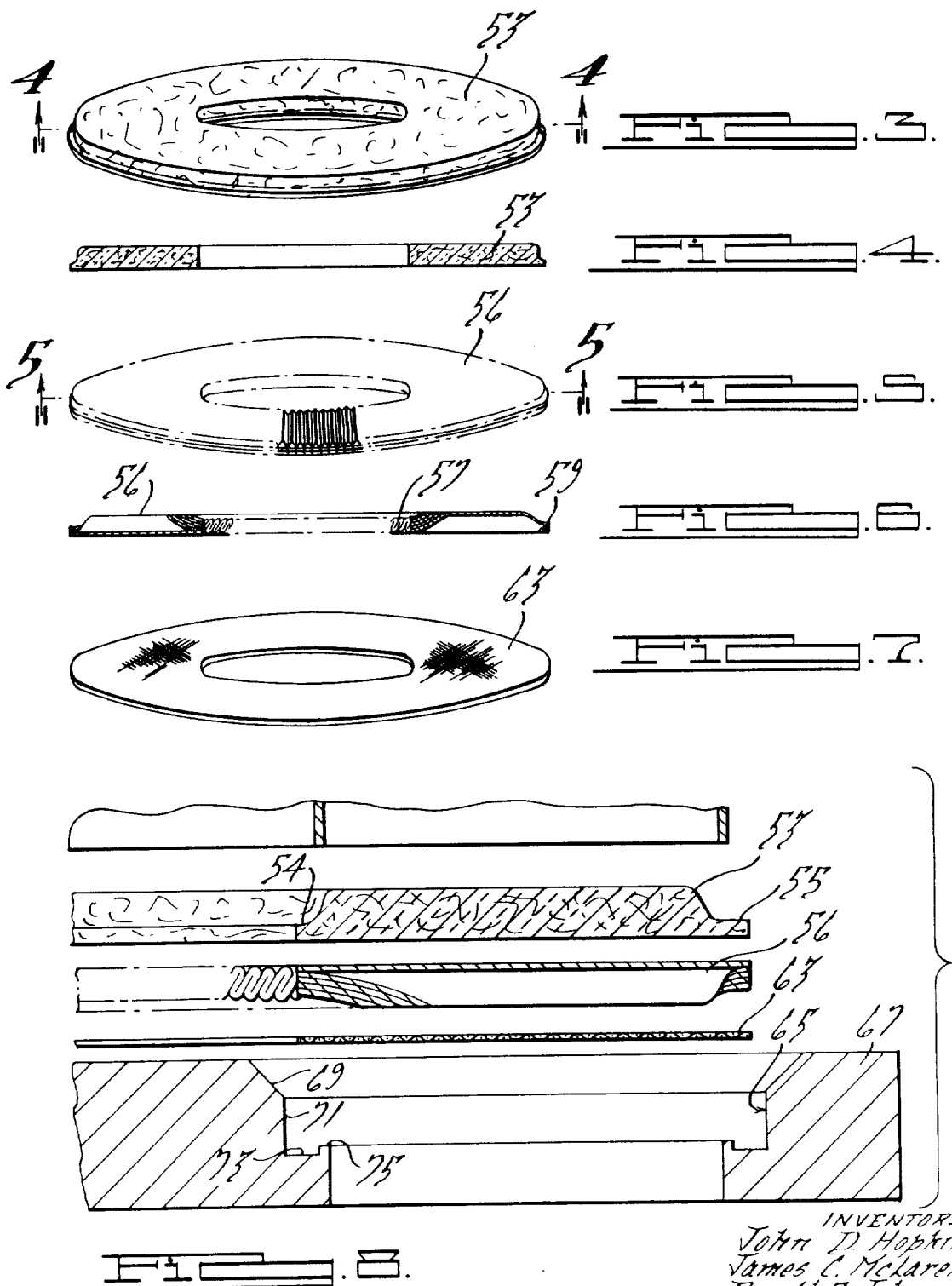
INVENTORS
John D. Hopkins,
James C. McLaren,
Ronald A. Johnson,
Robert J. Offer
BY Harness, Dickey & Pierce
ATTORNEYS

PATENTED AUG 8 1972

INVENTORS
John D. Hopkins,
James C. McLaren,
Ronald A. Johnson,
Robert J. Offer.
BY Harness, Dickey & Pierce
ATTORNEYS

3,681,898

DUAL MEDIA AIR FILTER

RELATED APPLICATION

This application is a continuation-in-part of our copending U. S. application, Ser. No. 797,466, filed Feb. 7, 1969.

BACKGROUND OF THE INVENTION

Production air filter specifications for a major automobile manufacturer requires the air filter for current automobiles to have a dirt-holding capacity of 200 grams of AC coarse dust, pass 320 CFM (cubic feet per minute), and be 98 percent efficient. Future specifications are expected to require the air filter to have a capacity of 500 grams, pass 500 CFM, and have a dirt removal efficiency of 98 percent. In addition, it is desired that the air filter silence incoming air noise, that it have a low overall height or flat silhouette to permit lowering of hood lines, that flexibility of housing shape or design be available so that the air filter can be adapted to the mounting and space conditions presented by different cars and models, that the filter be of a fail-safe design to prevent unloading of trapped particles and/or prevent unfiltered air from flowing through the element and entering the engine, and that the filter be capable of mass production at low cost and with consistent uniformity of the individual filters.

SUMMARY OF THE INVENTION

It is the basic purpose of this invention to provide an air filter construction incorporating all the features and exceeding all the requirements set forth above. It is also a purpose of the invention to provide a relatively rigid, self-contained dual media air filter member construction that satisfies the filtering requirements mentioned and, in addition, provides a sealing means that furnishes the complete air leak sealing required for air filter housings having hot air control devices.

The invention contemplates the use of a suitably constructed housing with inner and outer ring-like ledges to receive special inner and outer squeeze seal joints formed in a filter member, the housing including disconnectable means to clamp the filter joints against the ledges in an air tight manner. The novel filter member of the invention is of an annular pancake shape, preferably circular, and comprises a homogeneous depth material of randomly oriented, controlled size, synthetic fibers bonded together to a controlled density and porosity to form a semi-rigid body serving as an upstream section. A downstream section is formed of known automotive air filter paper which may be a pleated or flat annular disc and disposed on the outlet side of the depth section. Preferably, there is a back-fire screen on the downstream side of the paper. Special resilient joints interlock rims on the inner and outer peripheries of the component parts and serve, upon filter member replacement, as fresh seals for the air cleaner housing. The depth section may be saturated to a controlled extent with a suitable impingement liquid prior to assembly with the other filter member components.

DESCRIPTION OF THE DRAWINGS

FIG. 1 is a cross section of a replacement type air filter embodying the invention shown in installed position on the air inlet tube of a carburetor which has been broken away;

FIG. 2 is a view similar to FIG. 1 but showing the parts in exploded position wherein the filter member can be removed and replaced with a fresh unit;

FIG. 3 is a perspective view of the depth element used in the dual media filter element;

FIG. 4 is a cross section along line 4—4 of FIG. 3;

FIG. 5 is a perspective view of one form of paper filter used in the dual media of this invention;

FIG. 6 is a cross section along the line 6—6 of FIG. 5;

FIG. 7 is a perspective view of the backfire screen used in the dual media filter element;

FIGS. 8–10 are a cross sectional view, broken away, showing steps in the assembly of the filter element.

DETAILED DESCRIPTION OF THE INVENTION

Figure 9:
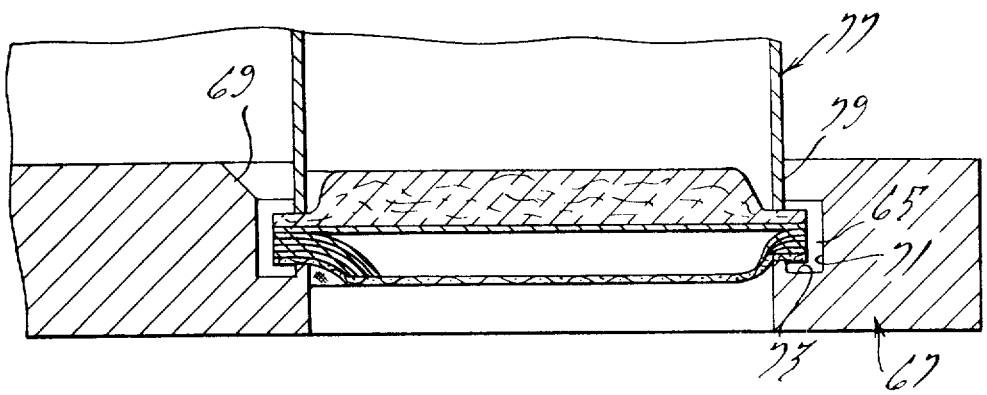

A typical carburetor inlet tube 1 is illustrated in FIGS. 1 and 2 and it is open at its top 3 to receive air for mixture with the fuel to form the air fuel mixture that is to be furnished to an internal combustion engine. The top end of the tube 1 is provided with a shoulder 4 on which is seated a gasket 5 that may be used to engage and seal the curled outlet tube portion 7 of an air filter unit through which the air passes prior to reaching the carburetor inlet opening 3. In a typical engine the carburetor inlet tube 1 will be provided with a fixed block 9 that supports an upwardly projecting attachment bolt 11 which is generally coaxial with the tube 1. The bolt 11 is threaded at its upper end and projects through an opening formed in the cover of the air filter so that tightening of the wing nut 13 on the bolt 11 will press the air filter unit tightly against the gasket 5 and form a suitable seal that will prevent bypassing of air around the filter.

The air filter unit 21 has an upper section or cover 23 and a lower tray section or shroud 25 which includes a central outlet tube 27 that provides the outlet ledge 7. The tray section has an outer sidewall 29 and an inner sidewall 31 which with the flat bottom 32 define an annular inlet chamber 33 for air entering the inlet snorkel 35. The outer wall 29 has an outwardly turned radially extending flange or ledge 37. The inner sidewall 31 is reversely bent at its top to form a radially extending ledge 39 that connects it to the top end of the outlet tube 27. The ledges 37 and 39 act as supports for the rims or peripheries of the dual media air filter element 41. The cover 23 has an annular outer shoulder section 43 which is formed adjacent an axially extending flange section 45, the sections 43 and 45 embracing and pressing the outer rim of the filter 41 on to ledge 37. The inner periphery of the filter element 41 is held on the ledge 39 by a compression ring 47 which has arms 49 connecting it to the cover 23. When the wing nut 13 is threaded down on bolt 11 the cover 23, therefore, presses the filter member 41 tightly on the ledge seats 37 and 39. When it is desired to replace the filter member 41, the nut 13 is removed to enable the cover 23 to be lifted from the unit so that the filter 41 can be changed.

As indicated in FIGS. 3 to 7, the filter member 41 preferably includes three separate air pervious members through which incoming air flows from chamber 33 to chamber 51 within the housing 21. The first of these is an annular pad-like disc 53 in the form of a relatively thick mat composed of controlled and selected diameter synthetic fibers which are bonded into a semi-rigid mass having a preselected and controlled density, porosity, and resistance to flow. The fibers are preferably uniform diameter viscose rayon coated with phenolic resin which is cured to bond the respective fibers together at their points of intersection. However, if desired, synthetic fibers, such as polyesters of the self-bonding type may be used. The fibers within the element 53 are randomly oriented so that the element is homogeneous throughout. The preferred fiber size is 15 denier, though sizes up to 40 denier have been used with good results. Mixtures of fibers can be used but we strongly prefer process controls so that uniformity of density, porosity, and resistance to flow in successively formed elements 53 is obtained in mass production and this goal is best achieved by using preselected uniform diameter synthetic fibers in preselected quantities by weight and which are randomly oriented and homogeneously mixed and compressed to a predetermined and preselected density so as to obtain a preselected and predetermined porosity and flow resistance. The preferred density is in the range of 0.30 to 0.42 grams per cubic inch and the percent by weight of phenolic resin fiber coating is preferably 30 to 40 percent. The fibrous ring forming element 53 is compressed to the desired density and to uniform thickness, preferably one-half inch, and may be individually molded or cut from a mat or bat which is suitably formed to meet the requirements just mentioned. Inner and outer compressed rims 54 and 55 are formed in the compression of the fibers. The element 53 is cured in the shape shown in FIG. 3 leaving it semi-rigid.

The filter member 41 also includes on the downstream side a non-woven filter element 56 which is preferably air filter paper used in automotive engines and FIGS. 1 through 10 reveal it as having radially extending pleats formed which increase its surface area and enable it to furnish structural support to the depth element 53 to inhibit the latter's flexing in the downstream direction. As indicated in the parent application, the member 56 may be formed by pleating a straight section of filter paper and then fanning it into a circle. The inner and outer peripheries of the pleats are crushed and adhered together to form inner and outer rims 57 and 59, as seen in FIG. 6.

The element 53 has a large dirt holding capacity and serves as a depth type filter. The paper element 56 has a relatively low dirt holding capacity but a high dirt removal efficiency when compared with the section 53.

As indicated in FIGS. 7 and 8, the third element of the dual media air filter unit 41 is a metallic mesh or screen 63 which forms the downstream face of the filter element and acts as a backfire screen.

Figure 10:
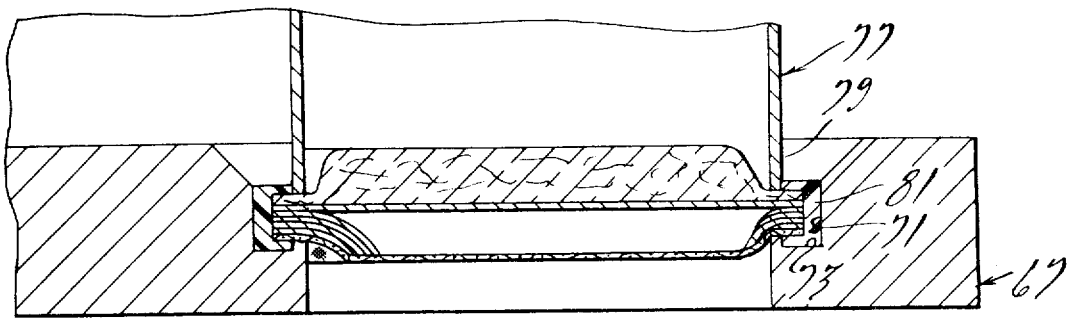

The individual elements of FIGS. 3 to 7 are, as shown in FIGS. 8 to 10, placed within an annular cavity 65 in a mold 67. The cavity has a tapered funnel inlet section 69 and a uniform diameter section 71 which terminates in a bottom section 73, the latter having an inner peripheral lip 75. As indicated in FIG. 9, the screen 63 rests on the lip 75 and it supports the rims of the paper element 56 and this in turn supports the depth element 53, the rims being arranged as shown in FIG. 9. A sleeve 77 in vertical alignment with the lip 75 is lowered to align, squeeze, and hold the elements on the lip 75 and to form the inner wall 79 of an annular seal cavity 81 located in cavity 65 on the outside of the contacting rims of the mat 53, the paper 56, and the screen 63. When the sleeve 77 is in place, a suitable moldable thermoplastic or thermosetting resilient and curable binder and sealing resin, such as plastisol, can be poured into the funnel section 69 so that it surrounds the edges of the filter elements in a more or less C-shaped cross section binder and seal member 83 and 85 for the inner and outer peripheries. Upon curing by heating the mold to the required temperature, the upper and lower mold sections can be separated and the integrated filter removed. The seals 83 and 85 are resilient but of definite shape and bind the component parts of the filter element together, provide some rigidity and structural integrity, as well as furnish an excellent gasket or seal means at the inner periphery and outer periphery of the air filter member. Thus, when the cover 23 is clamped to the tray 25, there will be a complete air tight squeeze seal for the housing 21. In the past, it has been common to furnish such seals as a part of the housing. By making the seals a part of a replaceable filter element 41, fresh seals are automatically inserted upon replacement of the air filter to thereby insure air tightness of the filter unit 21. This overcomes loss of seal commonly experienced with conventional permanent seals due to deformation, cracking, weathering, or actual loss.

The use of plastisol binders 83 and 85 according to the present disclosure, permits wetting of the depth element 53 before the filter member 41 is assembled. This permits the easy and accurate control of the uniformity and weight of impingement liquid that is applied or adsorbed by the element 53 and experience has shown that such prior application of the impingement liquid has no adverse effect on the plastisol binders 83 and 85 or on their curing. With the present arrangement the element 53 can be wetted after it is cured by emersion in the wetting liquid and then centrifuging or squeezing through rollers to remove the excess wetness, either method providing accurate control over the amount of wetting agent. Thereafter it can be assembled as shown in FIGS. 8-10.

Figure 11:
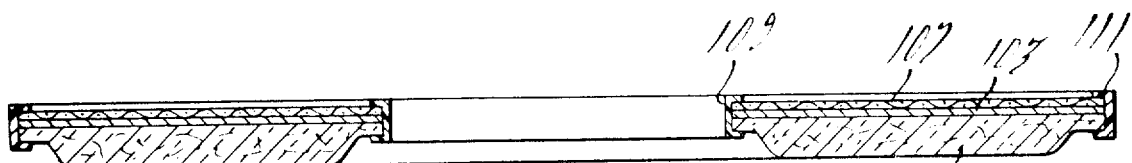
FIG. 11 is a cross section through a modified filter element construction.

Referring to FIG. 11 a modified form of filter member 101 is shown. It is substantially the same as the member 41 except that the pleated paper element 56 is replaced by a flat paper element 103. Thus, the element 101 has on the upstream side a depth element 105 corresponding to element 53, the paper element 103 engages the outlet face of the depth element 105, and, if desired, a backfire screen 107 corresponding to screen 63 may be placed on the outlet side of the paper element 103. These elements are sealed and bound together in the same manner described above by inner and outer plastic seals and binders 109 and 111.

With a proper combination of density of the mat 105 and the permeability of the paper 103, performance adequate to meet many specifications can be obtained. The paper is preferably automotive engine type air filter paper composed of cellulose fibers impregnated with phenolic resin (and cured) to the extent of about 20 to 25 percent of the paper weight. The basic weight of the paper is preferably approximately 80 pounds per 3,000 square feet and it should necessarily be of a very uniform and high permeability type. Flat paper sheets of about 30 mills thickness with a burst test strength of about 6 psi (Mullen) having a permeability rating in the 350 cfm/sq.ft/0.5 inch $H_2O$ air flow range provide the required restriction levels and filtration requirements.

Variations in the specific details described above may be made without departing from the spirit and scope of the invention.

We claim:

1. An air filter assembly having a flat silhouette and adapted for use on automotive internal combustion engines comprising a housing having a vertical axis and a height along said axis that is relatively small compared with the width of the housing transverse to said axis, said housing having a tubular wall means providing central outlet passage substantially coaxial with said axis and first housing wall means providing an annular air inlet chamber disposed around and substantially concentric with said outlet passage, said air inlet chamber having an inlet for air to be filtered, said housing having second housing wall means providing an air outlet chamber communicating with said outlet passage, said housing including inner and outer annular seats and an annular pancake shaped filter body supported on said seats and separating the inlet chamber and the outlet chamber, said filter body being substantially coaxial with said vertical axis and having a height in the direction of said axis that is relatively small compared with the width of the filter body transverse to the axis, the transverse distance between said inner and outer seats being relatively large compared with the vertical height of said filter body and the transverse width of the body between said inner and outer seats being unsupported, the inlet side of said body extending transversely between said inner and outer seats being exposed to the pressure of incoming air, said filter body comprising an inlet upstream section and a downstream outlet section each extending across the full width of the filter body and engaging each other on a surface defined by the outlet side of the inlet section of the body, the inlet side of said body comprising the inlet side of said inlet section and said inlet side being substantially parallel to said outlet side, said inlet section comprising a semi-rigid pad-like homogeneous porous body formed of synthetic, controlled and predetermined diameter fibers bonded to each other and having a predetermined substantially uniform thickness, density, and porosity throughout, said body having a high dirt-holding capacity and serving as a depth type filter, said outlet section comprising a body of substantially uniform thickness air filter paper having a high dirt removal efficiency and a relatively low dirt-holding capacity compared with the inlet section and having a relatively thin thickness compared with the inlet section, an annular metallic backfire screen engaging the outlet side of the paper forming said outlet section, said inlet and outlet section bodies and said screen having inner and outer peripheries, substantially C-shaped seal elements binding the inner peripheries together and the outer periph-eries together and forming inner and outer resilient annular sealing rims, said inner and outer rims engaging said inner and outer annular seats, said first and second clamping means in said housing respectively clamping said inner and outer rims to said inner and outer seats to form air tight squeeze seals between said filter body and housing to prevent bypassing of air from the inlet to the outlet chamber.

2. A dual media air filter comprising a substantially flat pad-like fibrous body of annular cross section and having a central axis and annular inlet and outlet substantially flat parallel faces extending transversely to said axis, annular flanges formed in the material of said body around the inner and outer peripheries, a sheet of air filter paper of annular configuration engaging the outlet face of said body and having inner and outer peripheral edges in juxtaposition with the annular flanges, and C-shaped annular resilient sealing members binding together the flanges and edges of the body and paper to unite the fibrous body and paper into a common substantially rigid air filter member, said sealing members providing resilient mounting rims for sealing and securing the member in an air filter housing, and an annular backfire screen engaging the outlet face of the paper and having peripheral edges embraced by said sealing members.

3. A dual media air filter comprising a pad-like fibrous body having substantially parallel and planar inlet and outlet faces and being of substantially uniform thickness and density throughout between said faces and forming a depth-type upstream air filter, said body being semi-rigid and subject to flexing as a result of air pressure on its inlet and outlet faces, a body of air filter paper type material engaging said outlet face, each of said bodies having integral substantially uniform thickness rims extending around their entire peripheries, a metallic backfire screen contacting the outlet side of the paper material, a sealing element joining the rims of the two bodies and the periphery of the backfire screen together to form a peripheral joint uniting the two bodies and screen into a common air filter member having a depth type upstream section and a paper type downstream section and serving as a means for mounting and sealing the member in an air filter housing.

4. The method of making an air filter member which comprises axially aligning an annular pad of fibrous material, an annular sheet of air filter paper, and an annular backfire screen so that their inner and outer peripheries are in contact to form inner and outer annular joints, surrounding said joints with moldable plastic material, and solidifying the plastic material to form resilient seals serving to bind the peripheries together and integrate the joints and unite the pad and paper.

* * * * *